United States Patent Office 3,506,705
Patented Apr. 14, 1970

3,506,705
ESTERS
Gerardus J. B. Corts, Haarlem, Netherlands, assignor to N.V. Koninklijke Pharmaceutische Fabrieken v/h Brocades-Stheeman & Pharmacia Looiersgracht, Amsterdam, Netherlands
No Drawing. Filed Aug. 3, 1966, Ser. No. 569,843
Claims priority, application Great Britain, Aug. 3, 1965, 33,228/65
Int. Cl. C07c 69/74
U.S. Cl. 260—484      3 Claims

ABSTRACT OF THE DISCLOSURE

New 3,3,5-trimethylcyclohexanol esters are provided which have the formula:

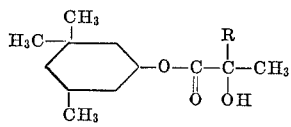

wherein R is a hydrogen atom or a methyl group. The new esters are prepared by reacting 3,3,5-trimethylcyclohexanol with a compound of the formula:

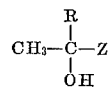

wherein R is a hydrogen atom or a methyl group and Z is —COOH group, a —COOR' group in which R' is a lower alkyl, or a —CN group. The new compounds are useful as vasodilators.

---

This invention relates to new therapeutically active esters, to processes for their preparation and pharmaceutical compositions containing them, and to methods of using them for therapeutic treatment.

According to the present invention, there are provided new 3,3,5-trimethylcyclohexanol esters of the general formula:

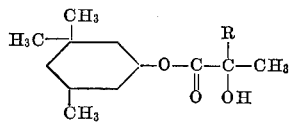

wherein R represents a hydrogen atom or a methyl group. When R is a hydrogen atom the ester is 3,3,5-trimethylcyclohexyl lactate and when R is a methyl group the ester is 3,3,5-trimethylcyclohexyl α-hydroxyisobutyrate, both of which esters are therapeutically active compounds useful as vasodilators with extremely low toxicity.

The esters of Formula I may be prepared by the application of methods known per se for the esterification of alcohols. Thus, according to a feature of the present invention, the compounds of Formula I are prepared by a process which comprises reacting 3,3,5-trimethylcyclohexanol with an acid of the formula:

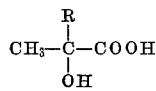

wherein R is as hereinbefore defined. The reaction is preferably conducted by heating the reactants in an inert organic solvent, such as benzene, toluene or dichloroethane, at the reflux temperature of the solvent in the presence of a catalytic quantity of a strong inorganic acid or an organic sulphonic acid. Typical suitable acids are sulphuric acid, benzenesulphonic acid and toluene-p-sulphonic acid.

According to a further feature of the invention, the compounds of Formula I are prepared by transesterification of an alkyl (preferably the ethyl) ester of an acid of Formula II to replace the alkyl residue with the 3,3,5-trimethylcyclohexane group. The reaction is preferably carried out by heating the alkyl ester of lactic or α-hydroxyisobutyric acid with 3,3,5-trimethylcyclohexanol in the presence of an alkali metal or alkali metal hydride, such as sodium, sodium hydride, potassium or potassium hydride, preferably under such conditions of temperature and pressure that the alkanol formed is distilled from the reaction mixture. An inert organic solvent, such as benzene, toluene or xylene, is advantageously employed as reaction medium.

According to another feature of the invention the compounds of Formula I are prepared by heating a nitrile of the formula

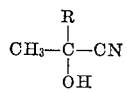

III (wherein R is as hereinbefore defined) with 3,3,5-trimethylcyclohexanol in the presence of a strong mineral acid such as hydrochloric acid, sulfuric acid, nitric acid and phosphoric acid. The reaction is preferably carried out in an inert organic solvent, such as dioxane, toluene or xylene.

According to a still further feature of the invention, preferably by heating the reactants in an inert organic solvent such as petroleum ether, a salt (e.g., alkali or alkaline earth metal salt) of an acid of Formula II is reacted with the reaction product of 3,3,5-trimethylcyclohexanol with an inorganic acid, which reaction product is a 3,3,5-trimethyl-halocyclohexane in the event the inorganic acid is a hydrogen halide and is an ester in the event the inorganic acid is an oxy acid such as sulfuric acid. The preferred hydrogen halide for this purpose is hydrogen chloride. The reaction is preferably conducted under such conditions of temperature and pressure that the water which was formed by the reaction of the 3,3,5-trimethylcyclohexanol with the inorganic acid is distilled from the reaction mixture.

The following examples illustrate the invention.

EXAMPLE I

To 2840 g. of molten 3,3,5 - trimethylcyclohexanol is added 15 g. of sodium with stirring. After the sodium has reacted, 1180 g. of freshly distilled ethyl lactate are added. Stirring is continued and the mixture is heated at a temperature of 160° C. About 420 ml. of ethanol are distilled off. The reaction mixture is cooled and 5 l. of diethyl ether are added. The resulting solution is filtered and is washed with water and then dried with sodium sulphate. The dried solution is filtered and diethyl ether and excess 3,3,5 - trimethylcyclohexanol are removed therefrom by distillation. 3,3,5-trimethylcyclohexyl lactate is obtained from the filtered, dried solution by fractional distillation. The fraction boiling at 100–125° C. at 17 mm. Hg pressure and consisting of about 1128 g. of crude ester is redistilled. The purified ester boils at 140° C. at 18 mm. Hg pressure and has a refractive index of 1.4520 at 20° C.

Analysis. — Calculated for $C_{12}H_{22}O_3$ (percent): C, 67.26; H, 10.35. Found (percent): C, 66.9; H, 9.7.

EXAMPLE II

Following the procedure of Example I but substituting 1320 g. of ethyl α-hydroxyisobutyrate for the 1180 g. of ethyl lactate, 1290 g. of 3,3,5-trimethylcyclohexyl α-hydroxyisobutyrate is obtained in crude form as a fraction distilling at 108–130° C. at 15 mm. Hg pressure. Redistillation yields the purified product boiling at 128–131° C.

at 15 mm. Hg pressure and having a refractive index of 1.4461 at 20° C.

*Analysis.* — Calculated for $C_{13}H_{24}O_3$ (percent): C, 68.38; H. 10.60. Found (percent): C, 68.3; H, 10.3.

EXAMPLE III

To a mixture of 710 g. (2.5 mol) of 3,3,5-trimethylcyclohexanol, 35.5 g. (0.5 mol) of lactonitrile, 13 g. of concentrated hydrochloric acid and 200 ml. of dioxane is added dropwise at a temperature of 30–35° C. a solution of 18.5 g. of anhydrous gaseous hydrochloric acid in 100 ml. of dioxane. After completion of the addition the mixture is kept at this temperature for another 30 minutes and then heated 3 hours at a temperature of 80–85° C. The next day the main part of the solvent is removed by distillation. The residue is dissolved in diethyl ether and washed with sodium bicarbonate until the solution no longer reacts acid. The solution is dried with sodium sulphate, filtered and the solvent is removed by heating. The residue is distilled; there is obtained a 70% yield (74 g.) of 3,3,5-trimethylcyclohexyl lactate boiling at 127–128° C. at 15 mm. Hg pressure.

EXAMPLE IV

To a suspension of 519 g. (0.75 mol) of calcium sodium lactate, $(C_3H_5O_3)_5Ca_2Na \cdot 8H_2O$, in 900 ml. of petroleum ether (boiling range 80–100° C.) is added dropwise at room temperature 187.5 g. of concentrated sulphuric acid. There is formed a sticky clotted substance which after addition of a solution of 852 g. (6 mol) of 3,3,5-trimethylcyclohexanol in an additional 100 ml. of the same petroleum ether can be stirred again. After addition of another 3 ml. of concentrated sulphuric acid the solution is heated to the boiling point and water is removed by distillation. The process is continued until the distilling liquid (distilland) becomes clear. After cooling, the distilland solution is washed with aqueous sodium bicarbonate until the solution no longer reacts acid. After drying the solution with sodium sulphate and filtration, the solvent is removed by heating. The residue is distilled under reduced pressure; there is obtained 545 g. of 3,3,5-trimethylcyclohexyl lactate boiling at 127–129° C. at 15 mm. Hg pressure (yield 68%).

The invention includes within its scope pharmaceutical preparations containing one or both of the therapeutically active compounds of Formula I in association with a pharmacologically acceptable carrier.

The preparations may take any of the forms customarily employed for administration of therapeutically active substances but the preferred types are those suitable for oral administration and especially tablets, pills, and capsules including the active compound. The tablets and pills may be formulated in manners known per se with one or more pharmacologically acceptable diluents or excipients such as lactose or starch, and include materials of a lubricating nature such as calcium stearate. Capsules made of absorbable material, such as gelatin, may contain the active compound alone or in admixture with a solid or liquid diluent. Liquid preparations may be in the form of suspensions, emulsions, syrups or elixirs of the active compound in water or other liquid medium commonly used for making orally acceptable pharmaceutical formulations, such as liquid paraffin, or a syrup or elixir base. The active compound may also be made up in a form suitable for parenteral administration, i.e. as a suspension or emulsion in sterile water or an organic liquid usually employed for injectable preparations, for example vegetable oils such as olive oil, or a sterile solution in an oganic solvent.

For oral administration as vasodilators, suitable daily dosages of the compounds of the present invention are about from 100 to 2,400 mg.

The invention is not to be construed as being limited to the particular embodiments set forth herein, since these are to be regarded as illustrative rather than restrictive.

What I claim and desire to secure by Letters Patent is:

1. 3,3,5 - trimethyl cyclohexanol esters of the general formula:

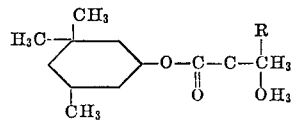

wherein R represents a hydrogen atom or a methyl group.

2. Ester according to claim 1, in which R is a hydrogen atom.

3. Ester according to claim 1, in which R is a methyl group.

References Cited

UNITED STATES PATENTS

| 1,831,025 | 11/1931 | Michael et al. | 260—484 |
|---|---|---|---|
| 2,409,329 | 10/1946 | Williams | 260—454 |
| 2,499,848 | 3/1950 | Catlin et al. | 260—484 XR |
| 2,598,263 | 5/1952 | Johnson et al. | 260—484 XR |

OTHER REFERENCES

Funcke et al., Chemical Abstracts, vol. 49: 10,888 (1955).

Migrdichian, "Organic Synthesis," Reinhold Publishing Corp., pp. 326–329 (1957).

Richter, Jr., Chemical Abstracts, vol. 60: 16041 (1964).

LORRAINE A. WEINBERGER, Primary Examiner

P. J. KILLOS, Assistant Examiner

U.S. Cl. X.R.

424—311